United States Patent [19]

Aleman et al.

[11] Patent Number: 5,649,757
[45] Date of Patent: Jul. 22, 1997

[54] AQUARIUM BACKGROUND ILLUMINATOR

[76] Inventors: Thomas M. Aleman; Kim Aleman, both of 2230 8th St., S.W., Akron, Ohio 44314

[21] Appl. No.: 334,527

[22] Filed: Nov. 4, 1994

[51] Int. Cl.$^6$ .................................................. A01K 63/06
[52] U.S. Cl. ........................ 362/101; 362/253; 119/266; 119/267
[58] Field of Search ........................... 362/101, 253, 362/370, 396, 351, 303, 341, 125; 119/266, 267, 253, 256; 40/406, 409, 553

[56] References Cited

U.S. PATENT DOCUMENTS

| | | |
|---|---|---|
| 1,777,944 | 10/1930 | Trovato . |
| 1,860,698 | 5/1932 | Venditti . |
| 2,847,973 | 8/1958 | Pugh . |
| 2,879,742 | 3/1959 | Morrill . |
| 3,324,573 | 6/1967 | Lavallee . |
| 3,730,138 | 5/1973 | Suchowski . |
| 4,133,024 | 1/1979 | Roehrick . |
| 4,469,726 | 9/1984 | Niinivuo . |
| 4,706,173 | 11/1987 | Hamada et al. ............ 362/341 |
| 4,951,607 | 8/1990 | Lapeyre . |
| 5,003,921 | 4/1991 | Tracy . |
| 5,089,940 | 2/1992 | Lanzarone et al. ........ 362/101 |
| 5,167,445 | 12/1992 | Linnenkamp et al. ..... 362/101 |

FOREIGN PATENT DOCUMENTS 3207417  9/1983  Germany ........................ 119/267

*Primary Examiner*—Stephen F. Husar
*Assistant Examiner*—Sara Sachie Raab
*Attorney, Agent, or Firm*—Oldham & Oldham Co., LPA

[57] ABSTRACT

The invention is directed to an apparatus for illuminating a decorative scene disposed adjacent to a wall of an aquarium, terrarium, or other such enclosure. The invention provides an easy to use apparatus which effectively and uniformly illuminates a decorative background and is suitable for use with a wide variety of shapes and sizes of these types of enclosures. In a preferred embodiment, the invention comprises a housing defining a cavity having an inner surface, an outer surface, an upper and lower edge, and a top portion, wherein at least a portion of the inner surface is a reflective surface and is inclined relative to the wall of the enclosure. The inclined inner surface includes means for reflecting light incident on at least a part thereof. The apparatus further comprises means for allowing said housing to be selectively attached upon an enclosure such that the reflective cavity lies exterior to and adjacent to at least a portion of the wall of the enclosure which has a decorative scene disposed thereon. A light source positioned external to the cavity projects light onto the reflective surface within the reflective chamber.

22 Claims, 3 Drawing Sheets

5,649,757

AQUARIUM BACKGROUND ILLUMINATOR

FIELD OF INVENTION

The present invention relates generally to an illuminating apparatus and more particularly to an apparatus designed to backlight a decorative scene which may be adhered or otherwise disposed adjacent to a wall of an aquarium, terrarium, or similar enclosure. The apparatus may also be used to effectively illuminate the interior of an enclosure such as an aquarium or terrarium through a transparent side wall thereof.

BACKGROUND OF THE INVENTION

Aquariums, terrariums, and other enclosures designed with transparent walls to allow the interior to be viewed are normally lighted, if at all, from a light source located in the lid or cover of the enclosure. To make the appearance of the enclosure more aesthetically pleasing, these types of enclosures commonly include decorative backgrounds such as a thin sheet of plastic having a decorative scene thereon adhered to or otherwise disposed adjacent to the back wall or the side walls thereof. Light from the light source in the lid may illuminate the decorative background to some degree, or if the enclosure is positioned properly, light from a window or other source such as an ordinary lamp may illuminate the decorative scene from outside the enclosure to provide an aesthetically pleasing background scene to the aquarium or terrarium. Although effective to some extent, these arrangements do not provide the correct source of light to effectively illuminate a decorative background. Normally, the aquarium or terrarium is not positioned in front of or adjacent to a window or a lamp. Further, these sources of light would not contain sufficient light throughout the day to effectively illuminate the background. Obviously, a window would only allow light in during daylight hours. An ordinary lamp would also be ineffective in that it provides an unevenly distributed source of light which does not uniformly illuminate such a background.

SUMMARY OF THE INVENTION

The present invention is therefore directed to an apparatus for illuminating a decorative scene disposed adjacent to a wall of an aquarium, terrarium, or other such enclosure. The invention provides an easy to use apparatus which effectively and uniformly illuminates a decorative background and is suitable for use with a wide variety of shapes and sizes of these types of enclosures. In the preferred embodiment, the invention comprises a housing defining a cavity having an inner surface, an outer surface, an upper and lower edge, and a top portion, wherein at least a portion of the inner surface is a reflective surface and is inclined relative to the wall of the enclosure. The inclined inner surface includes means for reflecting light incident on at least a part thereof. The apparatus further comprises means for allowing said housing to be selectively attached upon an enclosure such that the reflective cavity lies exterior to and adjacent with at least a portion of the wall of the enclosure which has a decorative scene disposed adjacent thereto. The invention may further comprise a light source which projects light onto the reflective means within the reflective chamber.

The housing preferably has a cross-sectional shape such that the reflective cavity, and the reflective means disposed therein, will cause light from a light source to be uniformly reflected out through an open end or mouth of the reflective cavity. In a preferred embodiment, the housing has a back wall, side walls and at least a top wall formed in approximately the cross-sectional shape of a right triangle such that the right angle is formed where the top wall of the housing meets the top region of a wall of the enclosure to which the apparatus is attached. The back wall is inclined toward the enclosure and preferably meets the wall of the enclosure at or near the bottom of the wall. In this configuration, the top and side panel of the housing, along with the inclined back wall are substantially sealed against the wall of the enclosure, wherein illuminating light directed into the reflective chamber is uniformly reflected into the enclosure at substantially right angled to the wall of the enclosure.

In a preferred embodiment, the housing is adjustable in size to allow the apparatus to be utilized in conjunction with a variety of sizes of aquaria, terraria, or other such enclosures. This adjustability is preferably accomplished by forming housing from two separate members which are designed to be slidably connected. The two members may be formed such that they slidably allow for the adjustment of the height of the apparatus, or may alternatively be formed such that they allow for the lengthwise adjustment of the housing size.

Based upon the foregoing, it is a principal object of the invention to provide an apparatus which is selectively attached to an aquarium, terrarium, or the like, and providing uniform illumination through a wall of the enclosure to illuminate an entire decorative background provided in association with the wall of the enclosure, dramatically improving the aesthetic appearance of the aquarium or the like thereby.

BRIEF DESCRIPTION OF THE DRAWINGS

These and other objects and advantages of the invention will become apparent upon a further reading of the Detailed Description taken in conjunction with the accompanying drawings, wherein.

DETAILED DESCRIPTION OF THE INVENTION

Figure 1:
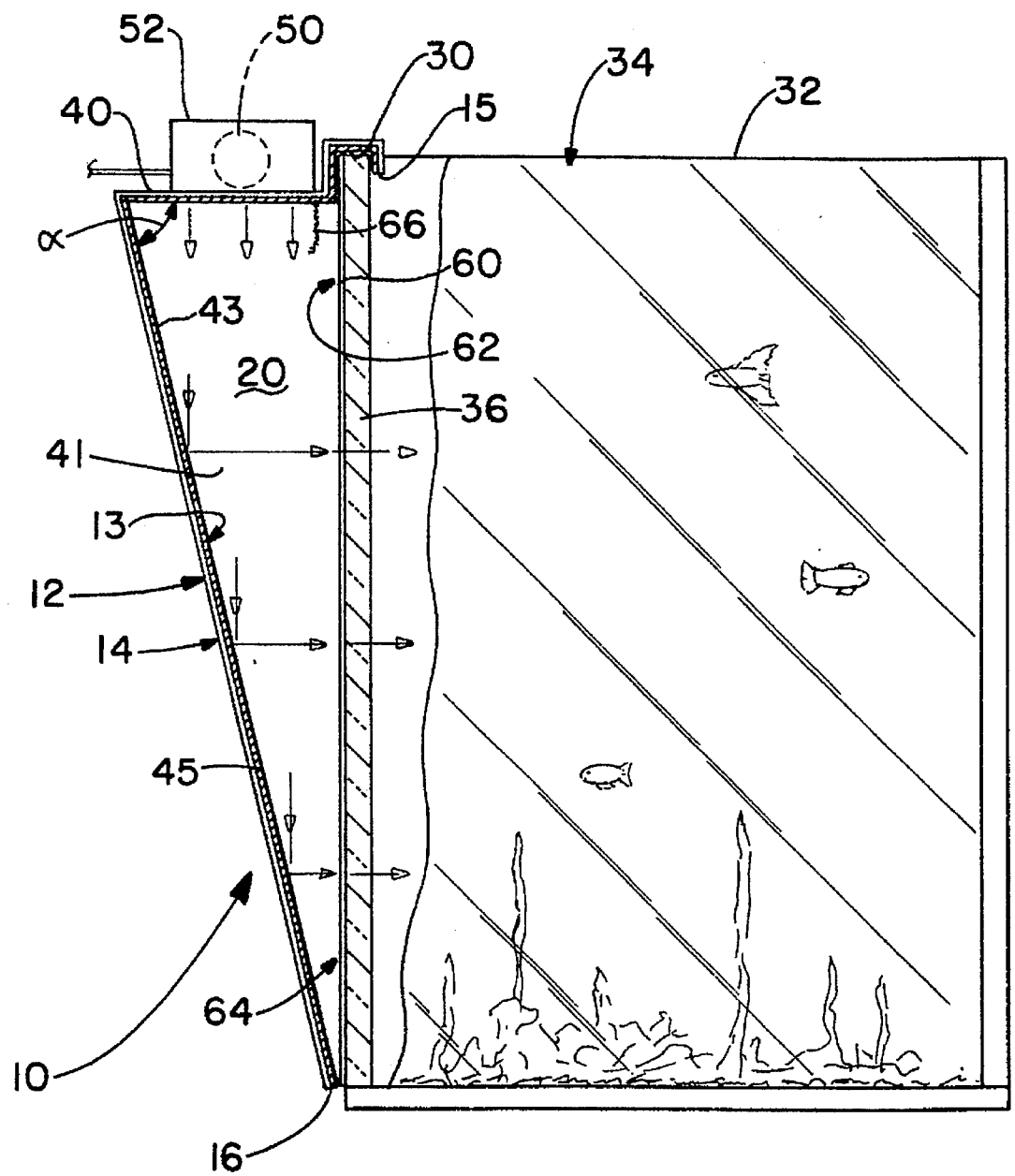
FIG. 1 is an end elevational view of a first embodiment of the invention, partially broken away and in section, illustrating the illuminating apparatus as it may be applied to an aquarium.

Reference will now be made in detail to the preferred embodiments of the invention, examples of which are illustrated in the accompanying drawings. Wherever possible, the same reference numerals will be used throughout the drawings to refer to the same or like parts.

The invention is seen generally at 10 in FIG. 1 and comprises a housing 12 having an inner surface 13, an outer surface 14, an upper edge 15, and a lower edge 16. In the preferred embodiment, the inner and outer surfaces 13 and 14 are provided by a back wall or panel 43, while upper edge 15 is formed as part of a top panel 40. Housing 12 is shaped such that reflective cavity 20 is formed thereby. In the preferred embodiment, cavity 20 is defined by substantially all of the inner surface 13 of housing 12. The cavity 20 is defined by housing 12 in association with a wall 36 of the aquarium, terrarium or other like enclosure. The housing 12 is therefore formed to provide a large opening or a mouth 22 which coincides with the enclosure wall 36, being approximately defined by the perimeter of the housing 12.

Housing 12 includes attachment means for external attachment of the housing 12 to an aquarium, terrarium, or other similar enclosure as shown in FIG. 1. The attachment means is preferably a hook-shaped groove 30 extending along at least a portion of the upper edge 15 of housing member 12 to allow housing member 12 to be hung from the top edge 32 of a wall of enclosure 34 such that the opening or mouth 22 of reflective cavity 20 lies adjacent to a wall 36 of enclosure 34. Again, it is preferable that the opening or mouth of reflective cavity 20 have dimensions which substantially correspond to the dimensions of wall 36. Hook shaped groove 30 may be replaced by numerous means of attachment as are known in the art. Such means for attaching housing member 12 to enclosure 34 may additionally or alternatively be disposed at other locations upon housing In the preferred embodiment, the top portion of outer surface 14 of housing 12 is preferably shaped to form a substantially horizontal top panel 40 which joins at an acute angle α with inclined back panel 43. When installed upon an aquarium or other enclosure as seen in FIG. 1, top panel 40 meets at approximately a right angle with top portion of wall 36. Inclined back panel preferably extends from top panel 40 toward the wall 36 of the enclosure 34, designed to intersect the enclosure at substantially the bottom of wall 36. Therefore, when installed upon enclosure 34, housing 12 (and reflective cavity 20) will have the preferable cross-sectional shape of a right triangle as seen in FIG. 1. Also in the preferred embodiment, the housing 12 will include side walls 41 extending from back wall 43 to fully enclose reflective cavity 20 by means of the walls of the housing in conjunction with the wall 36 of the enclosure 34. Providing a substantially closed reflective cavity 20 in conjunction with the wall 36 of enclosure 34 allows illuminating light introduced into the reflective cavity 20 to contribute to illumination of a decorative background associated with wall 36.

Also in the preferred embodiment, housing 12 includes at least one aperture 46 in the top panel 40 of said housing 12. As can be seen in FIG. 1, a light source 50, such as an ordinary incandescent or fluorescent light bulb, or a plurality of the same, is preferably disposed upon top panel 40 to lie adjacent to the at least one aperture 46. The positioning of the light source 50 above the top panel 40, with the light source 50 positioned within a housing 52 such that light generated from source 50 will be directed downwardly into the reflective cavity 20 of housing 12. Other possible positions for the light source such that light emitted from light source 50 can be projected into cavity 20. Such a configuration of housing 12, reflective cavity 20, and the location of the light source 50 is thought preferable to project light from the light source uniformly out through the mouth 22 of reflective cavity 20 to effectively backlight decorative scene 60 which is adhered or otherwise disposed adjacent to wall 36 of enclosure 34. Of particular importance to accomplish this the inclined back panel 43 with reflective inner surface 13 allows light to be reflected off of its entire length to provide substantially equal illumination to the top area 62 of the decorative scene 60 and the bottom area 64 of the decorative scene 60. In this configuration, it is desirable to direct light from light source 50 to be incident upon the reflective surface of the reflective cavity 20 so that light incident upon the wall 36 of enclosure 34 is reflected from inner surface 13. The inclination of the back panel 43 allows light to be instant along the entire height of the back panel 43, and to reflect light toward wall 36 of enclosure 34 along the entire height of panel 43. Further, the configuration allows light from the light source 50 to be reflected from a varying distance from wall 36 corresponding to the distance from the portion of the reflective surface to the light source 50. Thus, regions of the reflective surface closest to light source 50 are provided at a further distance from wall 36, while those portions of the reflective surface further from light source 50 are positioned closer to wall 36 of enclosure 34. These aspects contribute to providing uniform illumination over the entire surface of wall 36 and thereby providing uniform illumination of the decorative background 60.

Figure 2:
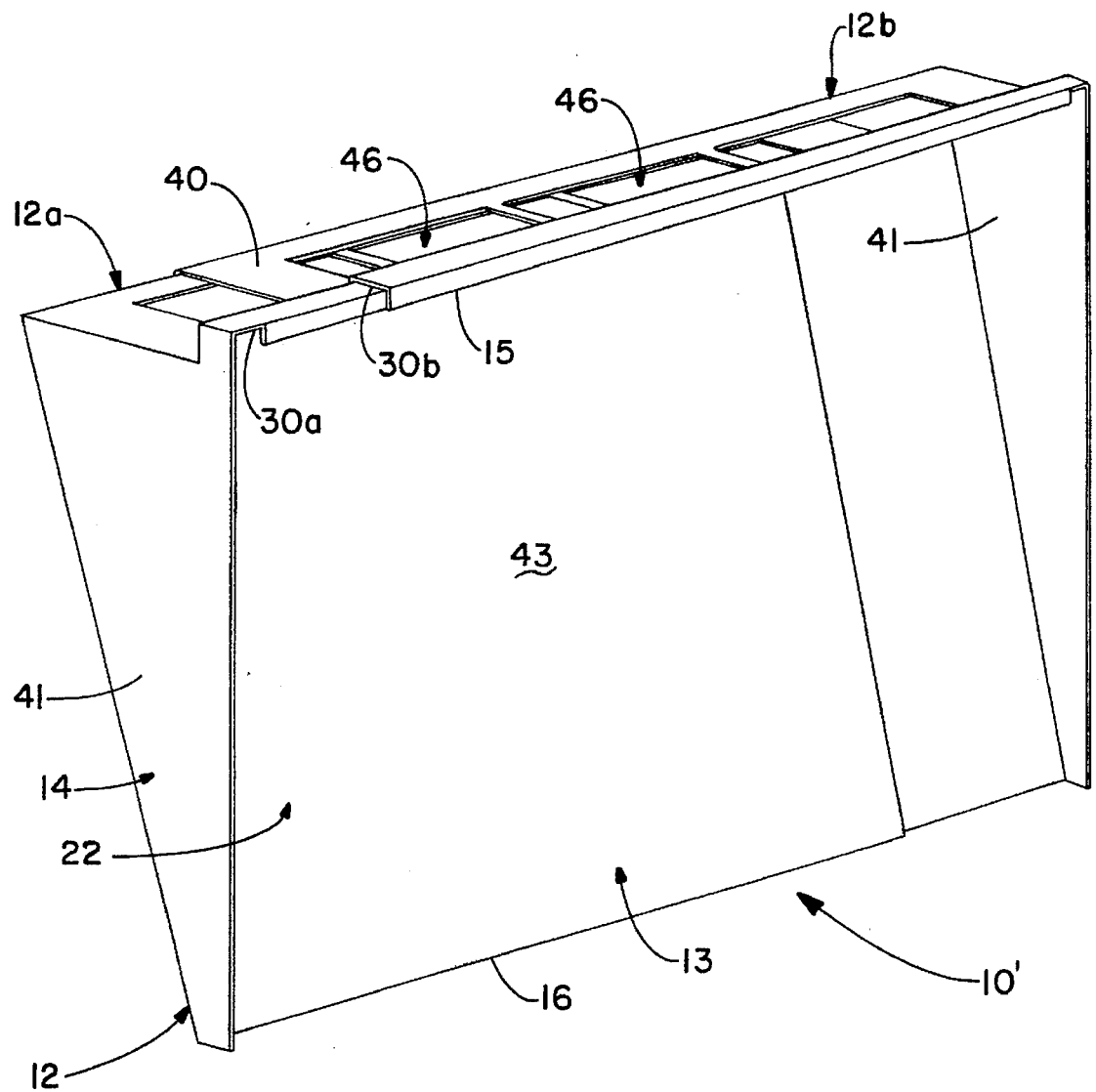
FIG. 2 is a perspective view of another embodiment of the apparatus of the invention, illustrating its lengthwise adjustability; and, FIG. 3 is a perspective view of an alternative embodiment of the apparatus illustrating means for adjusting the height of the apparatus.

The inclined back panel 43 preferably includes light reflective means for reflecting light from a source out through the mouth of reflective cavity 20 and through decorative scene 60 disposed adjacent to wall 36 as shown by the light ray paths shown in FIG. 1. As seen in FIG. 2, housing 12 may be formed entirely from a metal such as aluminum or stainless steel so that the material from which housing 12 is constructed provides an inner surface 13 of back panel 43 which is naturally light reflective. Alternatively, as seen in FIG. 1, housing 12 may be formed of other suitable materials known in the art, such as plastic, and further include a reflective laminate 45 which is adhered or otherwise disposed upon inner surface 13 of inclined back panel 43 to provide the light reflective means. As a further alternative to providing a reflective laminate 45 on the inner surface 13 of the back panel 43, a chrome or silver paint may be used to coat the inner surface 13 to provide the reflective means.

Also in another embodiment, the light reflective means will also include diffusing means acting to diffuse or scatter light incident thereon so as to more uniformly direct light rays toward wall 36 of the enclosure 34. It is in important aspect of the invention to uniformly illuminate the decorative background over the entire surface of wall 36, without causing point sources of light behind the decorative scene which would detract from providing an illuminated background which appears natural and not artificial. The diffusing means preferably will scatter light rays incident thereon in a wide variety of directions to avoid the creation of any point sources of light. The diffusing means may be provided as a roughened reflective surface provided as inner surface 13 of housing 12, with roughening of the surface causing light incident upon the reflective surface to be scattered as it is reflected thereby. Alternatively, the reflective surface itself may be provided as a diffusion grating or the like, also acting to scatter light instant thereon. It should be understood that the diffusing means of the preferred embodiment will not substantially affect reflection of light from the reflecting inner surface 13 toward the wall 36 of enclosure 34, but will scatter the light in a way to provide more uniform illumination over the entire surface of wall 36. Also to prevent the creation of any point sources of light in the illuminated background, it may be desirable to provide a screen 66 or further diffusing means positioned in the path of light originating from the light source 50 which would be incident upon the back wall 36. This screen 66 may also include a reflective surface to reflect light incident thereon back toward the reflective inner surface 13, or alternatively, the screen 66 may be constructed of diffusing means such as a diffusion grating or the like, causing scattering of light incident thereon.

As seen in FIG. 2, a further embodiment of the invention 101 includes housing 12 which is formed of two complementary members, a first member 12a and a second member 12b. The members 12a and 12b slidably fit together to provide a means for adjusting the length of the housing 12. This slidable fit can be accomplished by numerous means as are well known in the art. For example, hook shaped groove 30a of first member 12a may slidably receive hook shaped groove 30b of second member 12b to provide adjustment of the overall length of housing 12.

Figure 3:
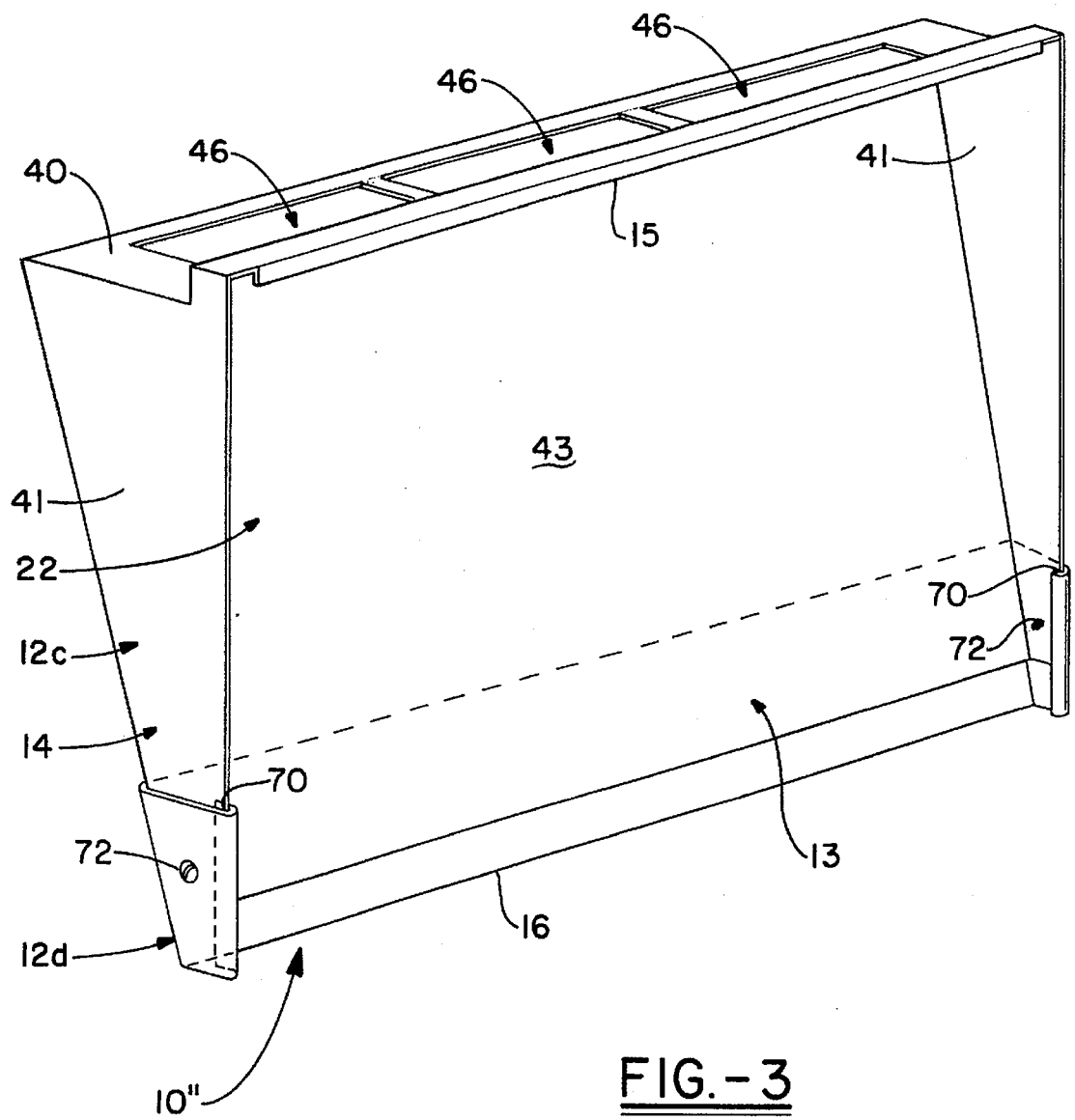

As another embodiment seen in FIG. 3, at 10b housing 12 may alternatively be formed from a separate top member 12c and bottom member 12d, to allow for slidable height adjustment of the housing 12. Top member 12c is preferably slidably received in groove 70 of bottom member 12d. Top member 12c and bottom member 12d may simply be frictionally secured together or selectively secured together by fastening means, such as screw 72; which may be provided to force top member 12c into frictional engagement with bottom member 12d. Groove 70 may alternatively or additionally be formed in top member 12c. The adjustability is not meant to be limited to complimentary members which slidably fit together, and many other suitable means for providing the apparatus with adjustability will be apparent to those skilled in the art. Both the length and height adjustability of the embodiments shown in FIGS. 2 and 3 allow the illuminating apparatus to be fitted to any particular size aquarium or like enclosure in an easy manner. As the shapes and sizes of such enclosures vary to a great extent, the adjustability of the apparatus as to its height or length dimension allows the apparatus to be adapted to a particular enclosure without affecting the advantages obtained thereby. It should be also be recognized that the housing 12 may be configured to work with differently shaped aquariums or like enclosures, such as circular tanks, with the reflective cavity corresponding substantially to the shape of the wall of the enclosure through which illuminating light is to be directed by means of the apparatus.

Also, while the foregoing description has set forth the preferred embodiments of the invention in particular detail, it must be understood that numerous modifications, substitutions and changes can be undertaken without departing from the true spirit and scope of the present invention as defined by the ensuing claims.

What is claimed is:

1. An apparatus for uniformly illuminating a decorative scene disposed adjacent to a wall of an enclosure, the apparatus comprising:

a housing having an inner surface, an outer surface, an upper edge, and a lower edge, wherein at least part of said inner surface defines a reflective cavity having a mouth and an inclined back wall, said inclined back wall of said inner surface including means for reflecting light disposed on at least a part thereof;

an attachment mechanism associated with said housing for allowing said housing to be selectively attached to said enclosure such that said mouth of said reflective cavity lies exterior to and adjacent with at least a portion of said wall of said enclosure having a decorative scene disposed adjacent thereto;

said outer surface of said housing including a panel having at least one aperture formed therethrough into said reflective chamber to allow a light source to be disposed adjacent to said panel so as to project light through said at least one aperture into said reflective cavity and onto said inclined back wall to be reflected thereby.

2. An apparatus as recited in claim 1, wherein, said housing is formed from at least two separate members wherein said at least two members include means for being movably joined together to provide for the adjustability of said housing.

3. An apparatus as recited in claim 2, further comprising, a light source positioned in association with said housing to project light into said reflective cavity and onto said means for reflecting light.

4. An apparatus as recited in claim 2, wherein, said outer surface of said housing includes a substantially horizontal panel having at least one aperture formed therethrough into said reflective chamber to allow a light source to be disposed adjacent to said substantially horizontal panel so as to project light through said at least one aperture into said reflective cavity.

5. An apparatus as recited in claim 4, further comprising, a light source designed to project light through said at least one aperture into said reflective cavity.

6. An apparatus as recited in claim 2, wherein, said housing is formed from a first member having an upper edge and a second member having an upper edge, and said means for joining said first and second members is a first complimentary groove formed in said upper edge of said first member and a second complimentary groove formed in said upper edge of said second member to provide said housing with means for slidably adjusting the length thereof.

7. An apparatus as recited in claim 2, wherein, said housing is formed from a top member and a bottom member, and said means for joining said top and bottom members is a groove formed in at least said bottom member for receiving said top member to provide said housing with means for slidably adjusting the position of said top and bottom members relative to one another.

8. An apparatus as recited in claim 7, wherein, said top member includes an upper edge and said means for allowing said housing to be disposed upon an enclosure is a hook-shaped groove formed along at least a portion of said upper edge of said top member.

9. An apparatus as recited in claim 2, wherein, said first and second members each include an upper edge and said means for allowing said housing to be disposed upon an enclosure is a first hook-shaped groove formed along at least a portion of said upper edge of said first member, and a second hook-shaped groove formed along at least a portion of said upper edge of said second member.

10. An apparatus as recited in claim 1, further comprising, a light source positioned in association with said housing to project light into said reflective cavity and onto said means for reflecting light.

11. An apparatus as recited in claim 10, wherein, said light source has associated therewith a screen means positioned between said light source and said wall of said enclosure to substantially prevent transmission of light rays which are directly incident upon said wall of said enclosure.

12. An apparatus as recited in claim 1, further comprising, a light source designed to project light through said at least one aperture into said reflective cavity.

13. An apparatus as recited in claim 1, wherein, said means for allowing said housing to be disposed upon an enclosure is a hook-shaped groove formed along at least a portion of said upper edge of said housing.

14. An apparatus as recited in claim 1, wherein, said means for reflecting light disposed on said inner surface includes diffusion means for scattering light incident thereon.

15. An apparatus as recited in claim 14, wherein, said diffusion means comprises a roughened reflective surface.

16. An apparatus as recited in claim 14, wherein, said diffusion means comprises a reflective surface having a plurality of reflective surfaces associated therewith.

17. An illuminating apparatus for directing illuminating light toward a light transmissive wall of an enclosure comprising:

a housing defining a cavity having an open end with said open end positioned adjacent said wall of said enclosure, said housing having a reflective inner surface over at least a portion thereof, said reflective surface positioned to cause light rays incident thereon to be reflected toward said wall of said enclosure, said housing further including an attachment mechanism for selectively attaching said housing to said enclosure with said open end of said cavity positioned adjacent to said light transmissive wall of said enclosure, and a light source associated with said housing to direct light into said cavity to be incident upon said reflective surface, wherein said reflective surface is inclined relative to said wall of said enclosure such that light from said light source is incident upon substantially the entire reflective surface for providing uniform illumination of said wall of said enclosure.

18. An apparatus as recited in claim 17, wherein, said light source is positioned external to said cavity, and said reflecting surface is inclined relative to said light source.

19. An apparatus as recited in claim 18, wherein, said housing is formed of said at least first and second members which are slidable relative to one another for adjustment of the size and shape of said housing.

20. The apparatus as recited in claim 19, wherein, said first and second members are slidably joined to one another to allow adjustment of the length of said housing.

21. The apparatus as recited in claim 19, wherein, said first and second members are slidably joined to one another to allow adjustment of the height of said housing.

22. An apparatus for uniformly illuminating a decorative scene disposed adjacent to a wall of an enclosure, the apparatus comprising:

a housing having an inner surface, an outer surface, an upper edge, and a lower edge, wherein at least part of said inner surface defines a reflective cavity having a mouth and an inclined back wall, said inclined back wall of said inner surface including means for reflecting light disposed on at least a part thereof, an attachment mechanism associated with said housing for allowing said housing to be selectively attached to said enclosure such that said mouth of said reflective cavity lies exterior to and adjacent with at least a portion of said wall of said enclosure having a decorative scene disposed adjacent thereto;

a light source positioned in association with said housing to project light into said reflective cavity and onto said means for reflecting light;

said light source has associated therewith a screen means positioned between said light source and said wall of said enclosure to substantially prevent transmission of light rays which are directly incident upon said wall of said enclosure.

\* \* \* \* \*